United States Patent
Suzuki et al.

(10) Patent No.: US 7,047,427 B2
(45) Date of Patent: May 16, 2006

(54) DISK SUBSYSTEM

(75) Inventors: Hiroshi Suzuki, Sagamihara (JP);
Hiromi Matsushige, Hiratsuka (JP);
Masato Ogawa, Chigasaki (JP);
Tomokazu Yokoyama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 346 days.

(21) Appl. No.: 10/382,803

(22) Filed: Mar. 6, 2003

(65) Prior Publication Data
US 2003/0200471 A1 Oct. 23, 2003

(30) Foreign Application Priority Data
Apr. 23, 2002 (JP) .............................. 2002-120896

(51) Int. Cl.
*G06F 1/26* (2006.01)
(52) U.S. Cl. ....................................... 713/300; 713/100
(58) Field of Classification Search ................ 713/300, 713/100
See application file for complete search history.

(56) References Cited

U.S. PATENT DOCUMENTS

| 5,033,112 | A | * | 7/1991 | Bowling et al. ............ 398/110 |
| 5,548,711 | A | * | 8/1996 | Brant et al. ..................... 714/5 |
| 5,652,891 | A | * | 7/1997 | Kitamura et al. ........... 713/324 |
| 5,812,754 | A | | 9/1998 | Lui et al. |
| 6,012,119 | A | * | 1/2000 | Ninomiya et al. .......... 710/305 |
| 6,356,984 | B1 | | 3/2002 | Day et al. |
| 6,418,539 | B1 | | 7/2002 | Walker |
| 6,477,139 | B1 | | 11/2002 | Anderson et al. |
| 6,578,100 | B1 | | 6/2003 | Ninomiya et al. |
| 6,684,282 | B1 | * | 1/2004 | Kocis .......................... 710/300 |
| 6,738,851 | B1 | * | 5/2004 | Lin ............................. 710/302 |
| 2003/0018756 | A1 | | 1/2003 | Nguyen et al. |
| 2003/0204770 | A1 | | 10/2003 | Bergsten |

FOREIGN PATENT DOCUMENTS

| JP | 01-253995 | 10/1989 |
| JP | 03-171214 | 7/1991 |
| JP | 06-151018 | 5/1994 |
| JP | 11-054967 | 2/1999 |

OTHER PUBLICATIONS

Cutts et al., "Low-Cost Interconnection of SCSI Devices", Jun. 1995, IBM Technical Disclosure Bulletin, vol. 38, No. 06, pp. 41-43.*
Seki et al., "Communication Device Between Systems", Aug. 7, 1982, Japanese Publication 57-127243.*

* cited by examiner

Primary Examiner—Lynne H. Browne
Assistant Examiner—Tse Chen
(74) Attorney, Agent, or Firm—Mattingly, Stanger, Malur & Brundidge, P.C.

(57) ABSTRACT

A power source control apparatus for a disk subsystem includes a plurality of hard disk drives (HDDs) each with two systems of fiber channel interface ports, an HDD drive section, and an HDD control logic section. The HDD drive section includes two systems of fiber channel control sections, each of which includes a fiber channel interface and a fiber channel control interface. The HDD control logic section includes two systems of HDD control logics that control read/write accesses to the HDDs. Fiber channel control signals are supplied from the HDD control logics to the fiber channel control interfaces, respectively, and the fiber channel control signals are also used to control the power source of the HDD drive section.

5 Claims, 5 Drawing Sheets 10, 11 : HDD Control Logic
13, 18 : Fiber Channel Control Signal
21, 24 : Fiber channel Control Interface
31 : HDD
34 : HDD Control Logic Section
35 : HDD Drive Section

DISK SUBSYSTEM

BACKGROUND OF THE INVENTION

1. Field of the Invention

The present invention relates to a disk subsystem, and a power source control apparatus for a disk subsystem and/or a disk subsystem apparatus that is operated uninterruptedly.

2. Related Background Art

An existing disk subsystem apparatus is required to operate uninterrupted 24 hours a day, 365 days a year, and to have high density/large capacity through expansion of stored data. Accordingly, the following technology is conceivable for a power source control apparatus of a disk system apparatus.

For example, a disk subsystem apparatus includes in its basic structure a main power source, a power source control circuit, a power source for the power source control circuit, a hard disk drive (HDD) control logic section that controls data transfer, an HDD drive section that drives HDDs with fiber channel interface ports, and a fiber channel interface.

In the basic operation with this structure, when an apparatus switch is turned on while the power source control circuit is supplied with power from the power source for the power source control circuit, power is supplied from the main power source to the HDD control logic section and the HDD drive section, which makes the disk subsystem apparatus operable. The control by the HDD control logic section allows read/write access via the fiber channel interface to the HDDs of the HDD drive section.

However, with this structure if a failure occurs in any one of the parts, read/write access to the HDDs becomes impossible, such that the uninterrupted operation cannot be continued. Further, due to the lack of expandability in the HDD drive section, such an apparatus cannot meet demands for large capacity.

In view of the above, first, in order to make uninterrupted operation of the apparatus possible, the apparatus must be able to operate normally without any decline in its functions or performance even when a part of its components fails during operation, the apparatus must be able to specify the failed part and report it, and the failed part must be replaceable while the apparatus operates normally.

To achieve this, the basic structure described above must be a double-sided structure, the power source system needs to be provided with a separate power source boundary between the two sides; and the data transfer system that is the fundamental function of the apparatus needs to use two systems of fiber channel interface ports provided on the HDDs in order to make the path from the HDD control logic section to the HDDs redundant (i.e., duplicated) for read/write accesses to the HDDs. As a result, even if a failure occurs somewhere on one side of either the power source system or the data transfer system, the other side can guarantee operation. Further, the HDDs should have a RAID structure, which will allow rebuilding of a failed disk.

Secondly, with regard to achieving high density/large capacity, the HDD control logic section and the HDD drive section should be provided independently of each other to provide expandability to the HDD drive section; through this, the HDD drive section can be expanded (or reduced) as necessary.

For example, in the power source system, a new power source boundary may be provided between the HDD control logic section and the HDD drive section. The HDD control logic section may have a power source control circuit for the HDD control logic section and a dedicated power source for the control circuit, while the HDD drive section may have a power source for the HDD drive section, as well as a control circuit to control the power source of the HDD drive section under the control of the HDD control logic section, and a dedicated power source for the control circuit. A dedicated interface for power source control between the HDD control logic section and the HDD drive section is required on each expansion section.

In the data transfer system, a fiber channel interface between the HDD control logic section and the HDD drive section, a fiber channel control interface for the HDD control logic section to control the connection configuration of the HDDs, a fiber channel control circuit on the HDD drive section, and a fiber channel interface between the HDD drive section and the HDDs are provided; and the HDD drive section including the expansion sections need to be controlled by the HDD control logic section and a fiber channel loop can be formed.

Moreover, in order to make uninterrupted operation possible even during the process of expanding the system, all of the structures described above must be made redundant (i.e., duplicated).

The following became apparent as a result of the inventors' examination of the power source control apparatus of a disk subsystem apparatus described above.

For example, in order to realize uninterrupted operation and high density/large capacity in a disk subsystem apparatus, the disk subsystem apparatus must be provided with the structure described above. To achieve this, there would be two sides to the power source boundary of the HDD control logic section and to the power source boundary of the HDD drive section's power source control section, as well as a power source boundary between the HDD control logic section and the HDD drive section. This results in a complex power source boundary structure, increases the number of parts in the power source system, and makes the apparatus large.

As a result, there may be more factors that can impede uninterrupted operation, such as rising failure rate and falling reliability of the apparatus; increasingly complex power source boundary as the HDD drive section expands, making maintenance work more difficult; and greater number of errors committed in maintenance work to repair failures. In addition, the price of the apparatus may become higher as a result of increased number of parts. Furthermore, due to the fact that power is supplied to the HDD drive section with the power on/off operation of the HDD control logic section on a power source control by power source control basis regardless of the actual operational status of the apparatus, non-operating parts become powered even if the HDD drive section is in a non-operating state; consequently, power is wasted and the power consumption of the apparatus as a whole may not correspond to its operations.

SUMMARY OF THE INVENTION

In view of the above, the present invention relates to a power source control apparatus for a disk subsystem that, by using fiber channel control interface signals, can realize a power source control in apparatus such as computers that can operate uninterrupted, require high density/large capacity, and are demanded to have high reliability and low price.

In accordance with an embodiment of the present invention, a disk subsystem comprising at least one HDD having a plurality of systems of fiber channel interface ports, an HDD drive section having a plurality of systems of fiber channel control sections, each of which includes a fiber channel interface with the at least one HDD and a fiber channel control interface, and an HDD control logic section having a plurality of systems of HDD control logics that control read/write access to the HDDs, wherein each of the fiber channel control sections includes a power source control circuit that controls the power source of the HDD drive section by using a signal for controlling the fiber channel control interface supplied from one of the HDD control logics to the corresponding fiber channel control interface.

Furthermore, a data transfer path between the HDDs and the HDD control logics via the fiber channel interfaces may be formed by a plurality of data transfer paths in a parallel configuration, and a power source path between the HDD drive section and the HDD control logic section may be formed by a plurality of power source paths in a parallel configuration, such that both of the data transfer path and the power source path may be in a redundant (i.e., duplicated) structure.

In accordance with an embodiment of the present invention, since each of the HDDs with the fiber channel interface has two systems of fiber channel interface ports, the disk subsystem is already provided with the fiber channel interface, as well as a fiber channel control interface to control the fiber channel interface and a fiber channel control circuit, for each system. By appropriating control signals for fiber channel control interfaces to control the power source of the HDD drive section, the power source of the HDD drive section can be controlled without using a dedicated circuit or a dedicated interface whose purpose is to control the power source of the HDD drive section, and the apparatus can realize a redundant (i.e., duplicated) structure for both the data transfer system and the power source system. From the perspective of data protection and operational guarantee in case of failure, the power source control structure as described makes it possible to realize uninterrupted operation and high density/large capacity, which are the fundamental objectives of the present invention.

Other features and advantages of the invention will be apparent from the following detailed description, taken in conjunction with the accompanying drawings that illustrate, by way of example, various features of embodiments of the invention.

PREFERRED EMBODIMENTS

An embodiment of the present invention will be described in detail below with reference to the accompanying drawings. In all of the drawings used to describe the embodiment, members having substantially the same function are assigned the same number, and descriptions of such members are not repeated.

Figure 1:
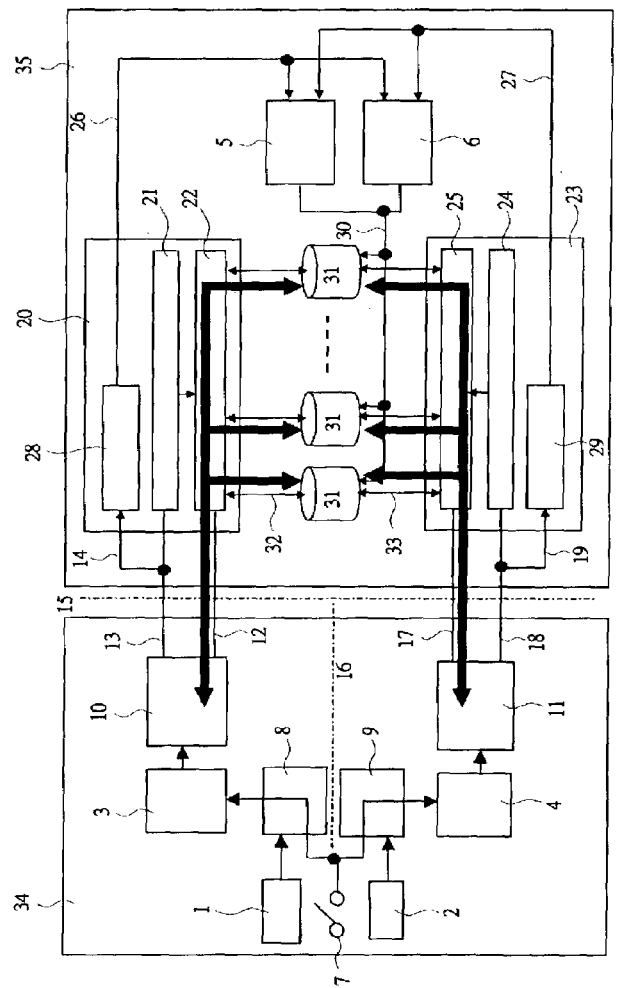
FIG. 1 is a block diagram indicating an overview of a power source control apparatus of a disk subsystem apparatus that uses fiber channel interface signals in accordance with an embodiment of the present invention.

FIG. 1 is a block diagram indicating an overview of a power source control apparatus of a disk subsystem apparatus that uses fiber channel interface signals in accordance with an embodiment of the present invention.

An apparatus according to the present embodiment includes an HDD control logic section 34 that controls a power source system and a data transfer system, and an HDD drive section 35 that drives HDDs each with fiber channel interface ports. The apparatus in accordance with the present embodiment is composed of a plurality of systems each having a data transfer system and a power source system (FIG. 1 indicates an example in which the apparatus consists of two systems) and therefore has redundant (i.e., duplicated) structures.

The HDD control logic section 34 consists of two systems each composed of the data transfer system and the power source system, whereby HDD control logic section 34 is provided with apparatus' main power sources 1 and 2; HDD control logic power source control sections 8 and 9 connected to the apparatus' main power sources 1 and 2, respectively; HDD control logic power sources 3 and 4 connected to the HDD control logic power source control sections 8 and 9, respectively; an apparatus power source switch 7 connected to each of the HDD control logic power source control sections 8 and 9; and HDD control logics 10 and 11 connected to the HDD control logic power sources 3 and 4, respectively. Fiber channel signals 12 and 17 and fiber channel control signals 13 and 18 are supplied from the HDD control logic section 34 to the HDD drive section 35.

The HDD drive section 35 consists of two systems each composed of the data transfer system and the power source system, whereby the HDD drive section 35 is provided with fiber channel control sections 20 and 23; fiber channel control interfaces 21 and 24 provided inside the fiber channel control sections 20 and 23, respectively; fiber channel interfaces 22 and 25 connected to the fiber channel control interfaces 21 and 24, respectively; HDD drive section power source control circuits 28 and 29; HDD drive section power sources 5 and 6 connected to the HDD drive section power source control circuits 28 and 29, respectively, through signal lines of respective HDD drive section power source signals 26 and 27; and a plurality of HDDs 31 that is connected to each of the HDD drive section power sources 5 and 6 through the signal line of an HDD power source signal 30 and that is connected to the fiber channel interfaces 22 and 25. Each of the HDDs 31 is provided with two systems of fiber channel interface ports 32 and 33.

In the HDD drive section 35, the fiber channel control signals 13 and 18 are supplied from the HDD control logic section 34 to the fiber channel control interfaces 21 and 24 provided inside the fiber channel control sections 20 and 23, respectively; the fiber channel signals 12 and 17 are supplied from the HDD control logic section 34 to the fiber channel interfaces 22 and 25, respectively; and fiber channel control section power source signals 14 and 19 that branch off from the fiber channel control signals 13 and 18, respectively, are supplied to the HDD drive section power source control circuits 28 and 29, respectively.

In terms of power source control in the structure of the apparatus, power is supplied from the apparatus' main power sources 1 and 2 to the power source control section of each of the HDD control logic power source control sections 8 and 9 and the HDD drive section power source control circuits 28 and 29. When the apparatus power source switch 7 is turned on, the HDD control logic power source control sections 8 and 9 supplies power under their control to the HDD control logic power sources 3 and 4. In this state, the HDD control logics 10 and 11 become operable, which makes the control of the HDD drive section 35 possible. The HDD control logics 10 and 11 operate the HDD drive section power source control circuits 28 and 29 through the fiber channel control section power source signals 14 and 19, and turn on the HDD drive section power sources 5 and 6 via the HDD drive section power source signals 26 and 27, respectively. In this state, the HDDs 31 receive the HDD power source signal 30 and become powered.

Aside from the power source control of the HDD drive section 35, the HDD control logics 10 and 11 control the fiber channel control interfaces 21 and 24 inside the fiber channel control sections 20 and 23 via the fiber channel control signals 13 and 18, respectively, and form fiber loops with the fiber channel signals 12 and 17, the fiber channel interfaces 22 and 25, and the fiber channel interface ports 32 and 33, whereby a read/write access to the HDDs 31 is made from the HDD control logic 10 through the fiber channel signal line 12, the fiber channel interface 22, and the fiber channel interface ports 32. Similarly, a read/write access to the HDDs 31 is made through ports on the other side, from the HDD control logic 11 through the fiber channel signal line 17, the fiber channel interface 25, and the fiber channel interface ports 33.

In FIG. 1, reference numeral 16 indicates a power source boundary of the HDD control logic section 34. The apparatus' main power source 2, the HDD control logic power source 4, the HDD control logic power source control section 9, the HDD control logic 11, the fiber channel signal 17, and the fiber channel control signal 18 are provided to realize a redundancy (i.e. duplication) with respect to the apparatus' main power source 1, the HDD control logic power source 3, the HDD control logic power source control section 8, the HDD control logic 10, the fiber channel signal 12, and the fiber channel control signal 13.

As a result, if a failure occurs anywhere on either side of the HDD control logic section 34, including the HDD control logic power source 3 or 4 while the apparatus is in operation, the failed part can be replaced without affecting the operation of the apparatus by using the path on the normally operating side.

In FIG. 1, reference numeral 15 indicates a power source boundary between the HDD control logic section 34 and the HDD drive section 35. If the HDD drive section 35 is not operating, the power consumption can be restrained by turning off the power sources 5 and 6 of the HDD drive section 35.

The HDD drive section 35 is formed from redundancy circuits. More specifically, the HDD drive section 35 is provided with the fiber channel signal 17, the fiber channel control signal 18, the fiber channel control section power source signal 19, the fiber channel control section 23, the fiber channel control interface 24, the fiber channel interface 25, the HDD drive section power source control circuit 29, the HDD drive section power source signal 27, the HDD drive section power source 6, and the fiber channel interface ports 33 to realize a redundancy (i.e., duplication) with the other circuit which include the fiber channel signal 12, the fiber channel control signal 13, the fiber channel control section power source signal 14, the fiber channel control section 20, the fiber channel control interface 21, the fiber channel interface 22, the HDD drive section power source control circuit 28, the HDD drive section power source signal 26, the HDD drive section power source 5, and the fiber channel interface ports 32. Through these redundancy circuits, any failed part can be replaced without affecting the operation of the apparatus, as in the HDD control logic section 34.

Next, the operation that takes place when a failure occurs in one part will be described in detail in each of the modes of failure 1 through 4.

Figure 2:
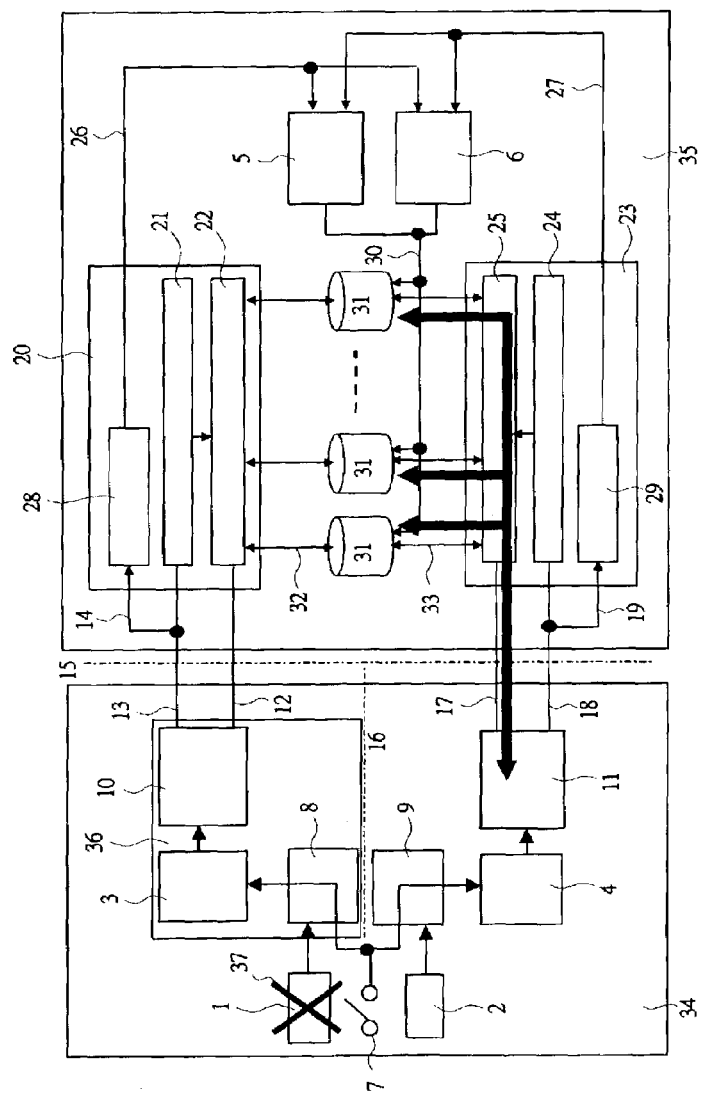
FIG. 2 is a diagram illustrating a situation in which a failure occurs in an apparatus' main power source in a structure shown in FIG. 1.

Mode of Failure 1:

FIG. 2 is a diagram illustrating a situation in which a failure has occurred in an apparatus' main power source in the structure described with reference to FIG. 1.

As shown in FIG. 2, when the apparatus' main power source 1 is a failed part 37, power supply to the HDD control logic power source control section 8, the HDD control logic power source 3 and the HDD control logic 10, which are indicated as a shutdown part 36 bounded by the power source boundaries 15 and 16, does not take place, which renders the shutdown part unusable. As a result, the fiber channel control section power source signal 14 cannot be used to control the power source of the HDD drive section 35 and to have read/write access to the HDDs 31 via the fiber channel interface ports 32.

However, the power source of the HDD drive section 35 can be controlled by using a redundant fiber channel control section power source signal 19, which allows read/write accesses to the HDDs 31 via the fiber channel interface ports 33, which in turn allows uninterrupted operation to be maintained.

Figure 3:
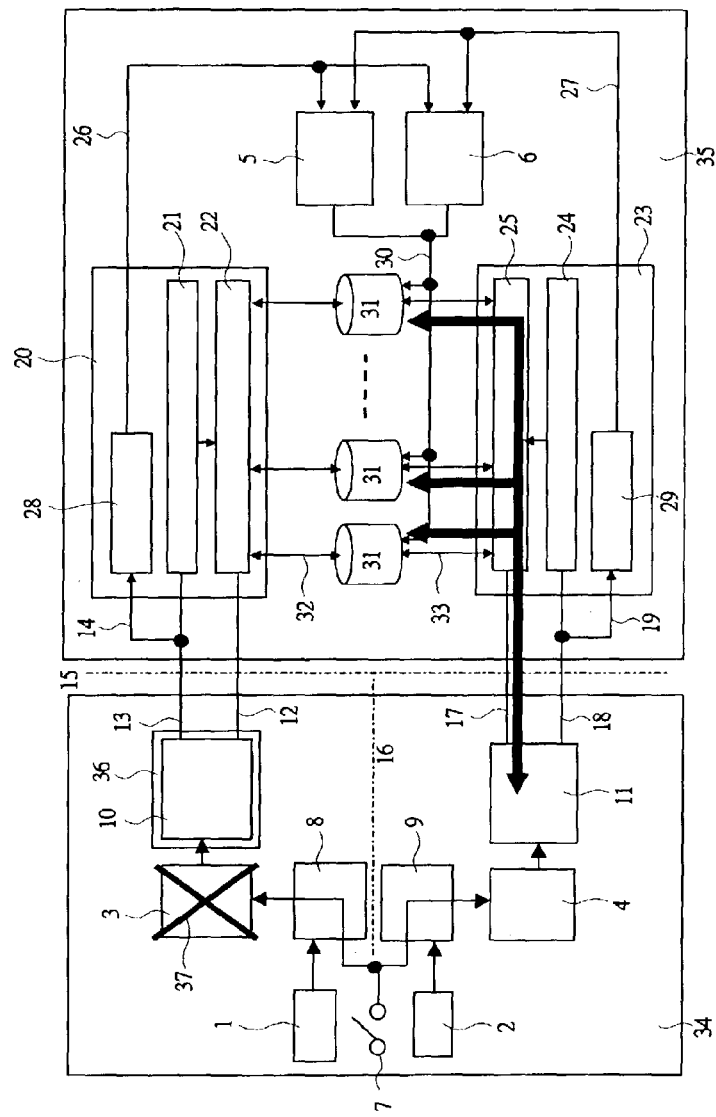
FIG. 3 is a diagram illustrating a situation in which a failure occurs in an HDD control logic power source in the structure shown in FIG. 1.

Mode of Failure 2:

FIG. 3 is a diagram illustrating a situation in which a failure has occurred in an HDD control logic power source in the structure described with reference to FIG. 1.

As shown in FIG. 3, when the HDD control logic power source 3 is a failed part 37, power supply to an HDD control logic 10, which is indicated as a shutdown part 36, does not take place, which renders this part unusable. As a result, the fiber channel control section power source signal 14 cannot be used to control the power source of the HDD drive section 35, and read/write accesses to HDDs 31 cannot be made via fiber channel interface ports 32.

However, the power source of the HDD drive section 35 can be controlled by using the redundant fiber channel control section power source signal 19, which allows read/write accesses to the HDDs 31 via fiber channel interface ports 33, which in turn allows uninterrupted operation to be maintained.

Figure 4:
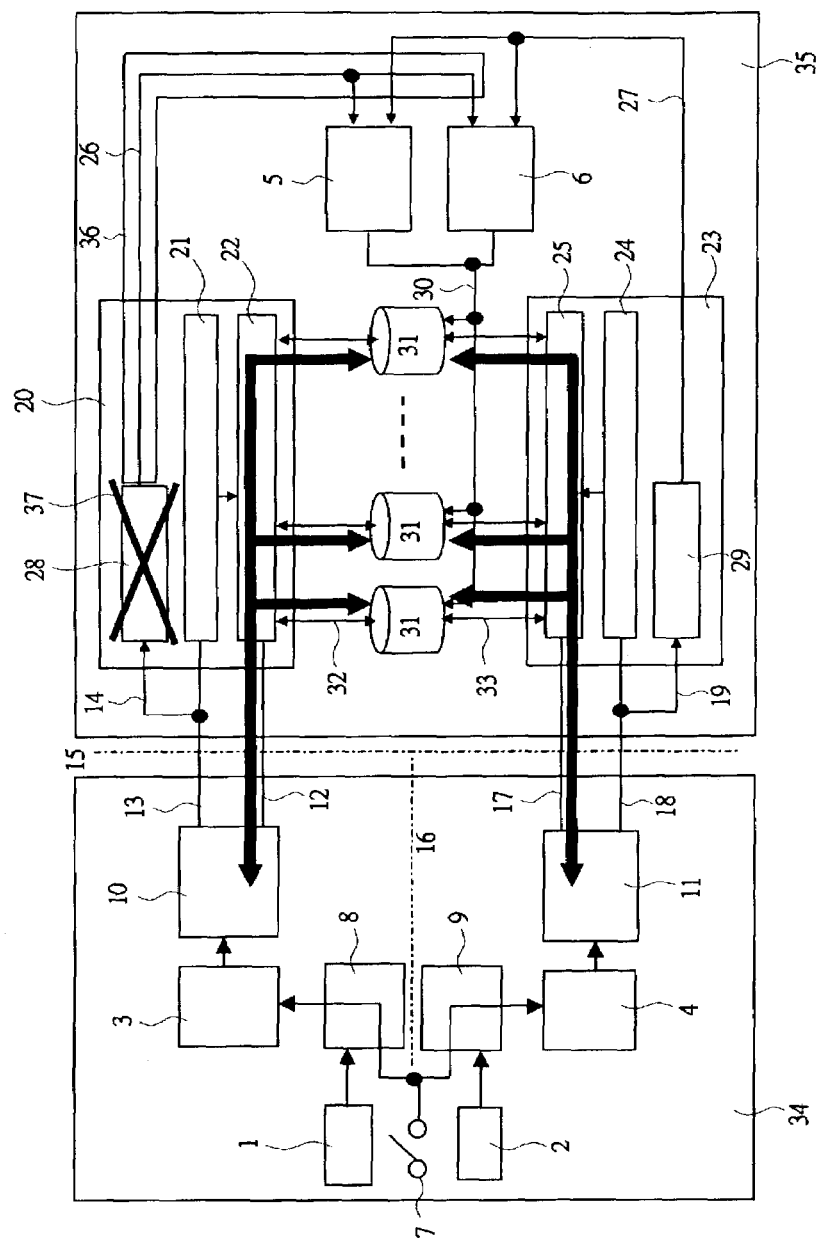
FIG. 4 is a diagram illustrating a situation in which a failure occurs in an HDD drive section power source control circuit in the structure shown in FIG. 1.

Mode of Failure 3:

FIG. 4 is a diagram illustrating a situation in which a failure has occurred in an HDD drive section power source control circuit in the structure described above with reference to FIG. 1.

As shown in FIG. 4, when the HDD drive section power source control circuit 28 is a failed part 37, the power source of the HDD drive section power sources 5 and 6 cannot be controlled via the HDD drive section power source signal line 26, which is indicated as a shutdown part 36.

However, the power source of the HDD drive section power sources 5 and 6 can be controlled by the HDD drive section power source control circuit 29 that serves as a redundant (duplicated) power source control circuit via the HDD drive section power source signal line 27, which makes power supply to the HDD drive section 35 and HDDs 31 possible. As a result, read/write accesses can be made to the HDDs 31 via the fiber channel interface ports 32 and the fiber channel interface ports 33, which allows uninterrupted operation to be maintained.

Figure 5:
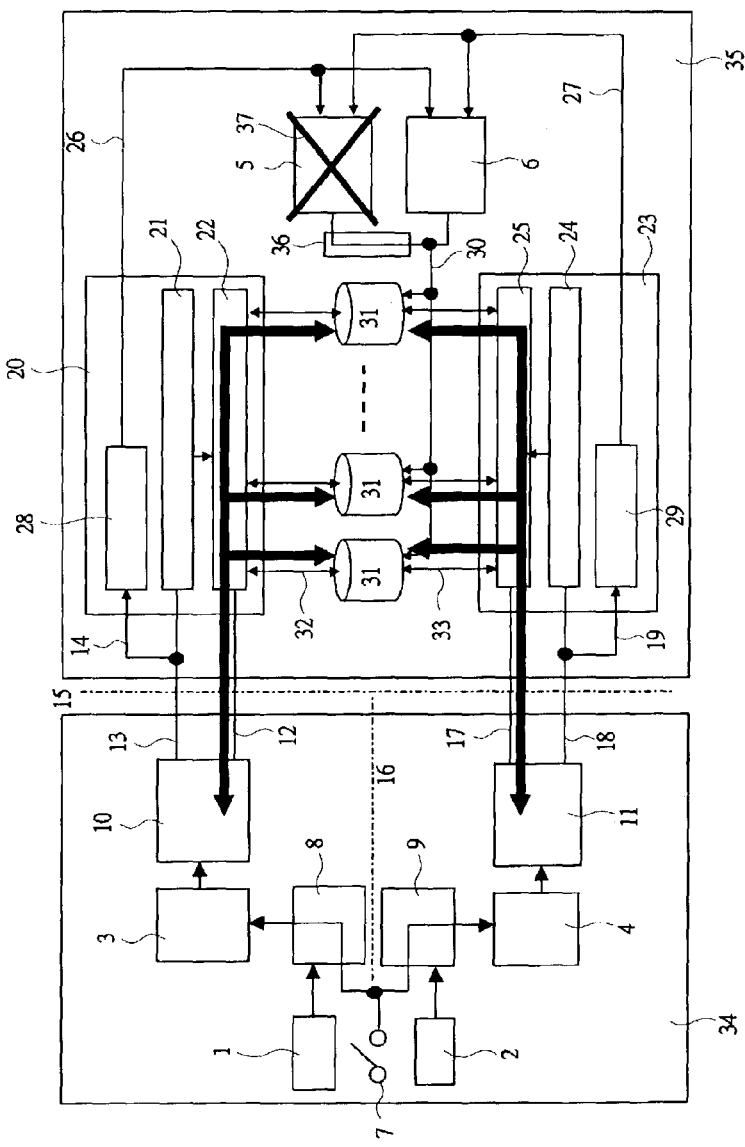
FIG. 5 is a diagram illustrating a situation in which a failure occurs in an HDD drive section power source in the structure shown in FIG. 1.

Mode of Failure 4:

FIG. 5 is a diagram illustrating a situation in which a failure has occurred in an HDD drive section power source in the structure described above with reference to FIG. 1.

As shown in FIG. 5, when the HDD drive section power source 5 is a failed part 37, power supply as indicated by a shutdown part 36 from the HDD drive section power source 5 to the HDD drive section 35 and to HDDs 31 does not take place.

However, power can be supplied to the HDD drive section 35 and the HDDs 31 from the HDD drive section power source 6 that serves as a redundant (duplicated) power source. As a result, read/write accesses can be made to the HDDs 31 via the fiber channel interface ports 32 and fiber channel interface ports 33, which allows uninterrupted operation to be maintained.

In accordance with an embodiment of the present invention, by appropriating fiber channel control interfaces of HDDs, the power source control of an HDD drive section of a disk subsystem apparatus whose objective is uninterrupted operation can be achieved without having to provide additional circuits, power sources, or power source control interfaces that are dedicated to control the power source of the HDD drive section.

Further in accordance with an embodiment of the present invention, a disk subsystem uses a fiber channel interface that is already logically redundant (duplicated), and therefore the following benefits can be obtained: no circuits to achieve redundancy (duplication) need be added; the number of parts in control circuit sections, of power source control interface sections of the HDD drive section, which are mounted in an HDD control logic section, as well as cables, can be reduced; and failure frequency can be reduced.

In addition, according to the present invention, the reduced number of parts such as cables simplifies connection work, which prevents damage or connection errors during connection work.

Moreover, according to the present invention, the power source can be shut off when HDDs are not installed or when fiber channels are not used, which reduces power consumption.

Based on the above, the reduction in number of parts according to the present invention leads to such effects as improved reliability through reduced failure frequency and reduced maintenance work to repair failures, lower apparatus price, lower apparatus power consumption, and high-density effect through smaller size of the apparatus.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk system comprising:
   at least one Hard Disk Drive (HDD) including a plurality of fibre channel interface ports;
   A HDD drive section having a plurality of fibre channel control sections, each of the fibre channel control sections having a fibre channel interface and a fibre channel control interface;
   a first power supply, in the HDD drive section, supplying power to the HDD drive section;
   a HDD control logic section including a plurality of HDD control logics that each controls read/write accesses to the at least one HDD via at least one fibre channel interface and at least one of the fibre channel ports;
   a second power supply, in the HDD control logic section, supplying power to the HDD control logic section;
   a power source control circuit, in the HDD drive section, that controls to supply power to the HDD drive section from the first power; and
   a power switch controlling to start to supply power from the second power supply according to be inputted ON,
   wherein the at least one fibre channel interface corresponds to the at least one of the fibre channel interface ports,
   wherein the at least one fibre channel control interface controls to connect and disconnect between the at least one fibre channel interface and the at least one of the fibre channel interface ports based on a fibre channel control signal transferred from at least one of the HDD control logics via a signal line,
   wherein the at least one of the HDD control logics transfers a power control signal to the power source control circuit via the signal line,
   wherein the power source control circuit picks out the power control signal from the signal line and controls to supply power based on the power control signal,
   wherein the second power supply supplying power to the HDD control logic section and the power source control circuit according to be inputted ON via the power switch, and
   wherein the power source control circuit controls to supply power to the HDD drive section from the first power supply in conditions which the power source control circuit is supplied power from the second power supply.

2. A disk subsystem according to claim 1, wherein a data transfer path between the at least one HDD and the HDD control logics via the fibre channel interface has a redundant structure.

3. A disk subsystem according to claim 1, wherein a data transfer path between the at least one HDD and the HDD control logics via the fibre channel interface is formed from a plurality of data transfer paths arranged in a parallel configuration.

4. A disk subsystem according to claim 1, wherein a power supply path in each of the HDD drive section and the HDD control logic section has a redundant structure.

5. A disk subsystem according to claim 1, wherein a power supply path in each of the HDD drive section and the HDD control logic section is formed from a plurality of power source paths arranged in a parallel configuration.

* * * * *